United States Patent
Jayapalan et al.

(10) Patent No.: US 12,236,431 B1
(45) Date of Patent: Feb. 25, 2025

(54) FRAUD DETECTION USING KNOWLEDGE GRAPHS

(71) Applicant: UIPCO, LLC, San Antonio, TX (US)

(72) Inventors: Vijay Jayapalan, San Antonio, TX (US); Jeffrey David Calusinski, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 287 days.

(21) Appl. No.: 17/458,669

(22) Filed: Aug. 27, 2021

Related U.S. Application Data (60) Provisional application No. 63/071,705, filed on Aug. 28, 2020.

(51) Int. Cl.
| | | |
|---|---|---|
| *G06Q 20/40* | (2012.01) | |
| *G06N 3/02* | (2006.01) | |
| *G06N 5/02* | (2023.01) | |

(52) U.S. Cl.
CPC ........... *G06Q 20/4016* (2013.01); *G06N 3/02* (2013.01); *G06N 5/02* (2013.01); *G06Q 20/4014* (2013.01)

(58) Field of Classification Search
CPC .... G06N 3/045; G06Q 20/4016; G06Q 40/08; G06Q 20/00; G06K 19/06009; G06F 21/64
See application file for complete search history.

(56) References Cited

U.S. PATENT DOCUMENTS

| | | | |
|---|---|---|---|
| 10,110,738 B1 * | 10/2018 | Sawant | G06N 3/044 |
| 11,308,497 B2 * | 4/2022 | Dong | G06Q 20/4016 |
| 2008/0192908 A1 | 8/2008 | O'Keefe | |
| 2010/0106611 A1 * | 4/2010 | Paulsen | G07F 17/32 705/40 |
| 2015/0350446 A1 | 12/2015 | Glass | |
| 2016/0379309 A1 * | 12/2016 | Shikhare | G06Q 40/08 705/4 |
| 2018/0130071 A1 * | 5/2018 | Yao | G06K 19/06009 |
| 2019/0050862 A1 * | 2/2019 | Oka | G06Q 20/00 |
| 2019/0122111 A1 * | 4/2019 | Min | G06N 3/045 |
| 2019/0311367 A1 * | 10/2019 | Reddy | G06Q 20/4016 |
| 2019/0312869 A1 * | 10/2019 | Han | G06F 21/64 |

OTHER PUBLICATIONS

Notice of Allowance mailed Sep. 15, 2022 for U.S. Appl. No. 17/458,682.

* cited by examiner

*Primary Examiner* — Saba Dagnew
(74) *Attorney, Agent, or Firm* — Plumsea Law Group, LLC (57) ABSTRACT

A system and method for tasks assistance using a learning module comprising a knowledge graph and associated graph neural network is disclosed. The system can represent data using a knowledge graph, and generate embeddings of the knowledge graph for detecting latent patterns in the data that may be obscured in a high dimensional representation of the data. The system can more readily detect fraud patterns and take appropriate fraud limiting actions.

20 Claims, 9 Drawing Sheets

FRAUD DETECTION USING KNOWLEDGE GRAPHS

CROSS-REFERENCE TO RELATED APPLICATION

This application claims the benefit of U.S. Provisional Patent Application Ser. No. 63/071,705 filed on Aug. 28, 2020 and titled "Digital Companion for Task Assistance", the disclosure of which is incorporated by reference in its entirety.

TECHNICAL FIELD

The present disclosure generally relates to fraud detection, and in particular, to using learning models to facilitate fraud detection.

BACKGROUND

Fraud detection systems typically analyze a particular stream of input data and look for anomalies according to previously identified patterns. For example, fraud detection systems may look at records of payments and analyze the data to identify potential fraud cases using preconfigured filters.

Fraud detection systems lack the ability to analyze data across different modalities, which limits the types of patterns that they can detect. This limits the types of actions the fraud detection system can have, especially when data is coming in across multiple different kinds of channels (web data, call data, etc.).

There is a need in the art for a system and method that addresses the shortcomings discussed above.

SUMMARY

In one aspect, a method of detecting and responding to fraudulent financial activity using a knowledge graph includes retrieving the knowledge graph, wherein the knowledge graph includes a set of nodes corresponding to financial transactions, generating an embedding of the knowledge graph, analyzing the embedding of the knowledge graph and detecting a fraudulent pattern within the embedding of the knowledge graph, and automatically taking a fraud limiting action in response to detecting the fraudulent pattern.

In another aspect, a method of detecting and responding to fraudulent financial activity using a knowledge graph including retrieving the knowledge graph, wherein the knowledge graph includes a set of nodes corresponding to financial transactions, generating an embedding of the knowledge graph, analyzing the embedding of the knowledge graph and detecting a first fraudulent pattern within the embedding of the knowledge graph, automatically taking a first fraud limiting action in response to detecting the fraudulent pattern, analyzing the embedding of the knowledge graph and detecting a second fraudulent pattern within the embedding of the knowledge graph, and automatically taking a second fraud limiting action in response to detecting the second fraudulent pattern.

In another aspect, a system for detecting and mitigating fraudulent financial transactions including a device processor, a non-transitory computer readable medium storing instructions that are executable by the device processor to: retrieve a knowledge graph from a graph database, wherein the knowledge graph includes a set of nodes corresponding to financial transactions, generate an embedding of the knowledge graph, analyze the embedding of the knowledge graph and detect a fraudulent pattern within the embedding of the knowledge graph, and automatically take a fraud limiting action in response to detecting the fraudulent pattern.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The embodiments provide systems and methods that facilitate detecting fraudulent patterns of financial transactions using a knowledge graph that can be encoded and/or modified using a graph neural network. Information about financial transactions may be stored as nodes connected by edges within a knowledge graph. A graph neural network may be used to learn latent representations of graph-structured data. These latent representations allow patterns that might otherwise be hidden in the graph-structured data to be easily revealed. In some cases, this allows patterns of fraud to be more easily detected within a set of data.

Using a knowledge graph with a suitable graph neural network allows for a dynamic system that can efficiently detect fraud patterns among non-homogenous data. This is possible because data of different sizes, types, structures, or modalities can be arranged into a knowledge graph where data is represented as nodes connected by various shared features.

Based on the type of fraudulent pattern detected, the embodiments provide systems and methods for taking appropriate fraud limiting actions. In the example where a pattern of disputed transactions at an identified merchant is identified, the actions could include one or more of: sending warnings/alerts to customers who have made recent purchases at the identified merchant, requiring additional verification for transactions at the identified merchant, limiting the maximum value of any transactions at the identified merchant, and denying any further transactions at the identified merchant until further fraud analysis can be performed.

The example embodiments described herein make use of methods and systems in artificial intelligence. As used herein, "artificial intelligence" may include any known methods or techniques in machine learning and related fields. As examples, artificial intelligence may include systems and methods used in natural language processing (NLP) and similar fields.

The embodiments provide an intelligent system, or intelligent agent, that learns across multi-channel tasks. In one embodiment, the intelligent system can comprise part of a digital companion that can interface with users across one or more modalities, such as a web interface, voice, text, or other modalities. As an example, the digital companion can interact with a user both visually and through natural language speech. In some cases, the digital companion can interact with a user through both voice and through a commonly viewable digital interface (such as a webpage) simultaneously. That is, the digital companion can not only switch between interacting via voice and digital interfaces, but has contextual awareness of the entire process, giving the system a more comprehensive understanding of the tasks to be completed by the user. Moreover, the digital companion may adapt to a wide spectrum of user abilities on digital properties (such as websites and mobile applications) and provide task fulfilment capabilities. The digital companion would emulate the properties of a human task specialist combined with assisted digital interaction to facilitate operations such as co-browsing.

Conventional voice-based agents may act as oracles that provide answers in an audio modality for users. These voice-based agents may comprise a front end digital device (such as a phone or smart-speaker) which communicates with a back end that contains the logic for natural language processing and databases for querying answers to questions. Such agents lack contextual awareness outside of a particular Q&A session, which is typically initiated by a user with a key phrase (such as the device name or a pre-appended word, like "Hey").

Likewise, bots, or other digital assistants, may comprise systems that are focused on helping a user complete a single task. For example, a bot may be built into a webpage to help explain key information to a user or provide assistance in filling out a form. These bots may comprise artificial intelligences that are trained on a highly specific domain.

Because users of a webpage, for example, may not have the skills necessary to complete a given task, it is important that those users can interact with an agent using natural language.

The embodiments comprise a digital companion that provides true multi-modality across both voice and digital interfaces, so that a user can seamlessly transition between interacting with the digital companion via voice and through a digital interface. As an example, while a user is reviewing a bill from a credit card company, the user could activate the digital companion. The user could then ask the digital companion about specific charges on his or her bill. The digital companion, which has domain knowledge about the bill format and user specific data can then query one or more backend systems to gather additional information for the user. For example, if the user asks "is this debit for Duluth LLC a fraudulent charge," the digital companion could query a backend system and retrieve information about Duluth LLC, to determine if there are related companies or products associated with the company that the user might recognize, thereby making the charge less likely to be fraudulent.

The digital companion can be invoked in various ways. In some embodiments, the digital companion can be invoked using vocal commands, spoken either into a user's mobile device, such as a phone, an enabled smart-speaker, or directly into the microphone user's home computer. In some cases, the digital companion could be invoked by clicking on a button on a webpage. Thus, in tasks that take place across multiple channels, such as voice and digital interfaces, a user could invoke the digital companion from any channel.

Figure 1:
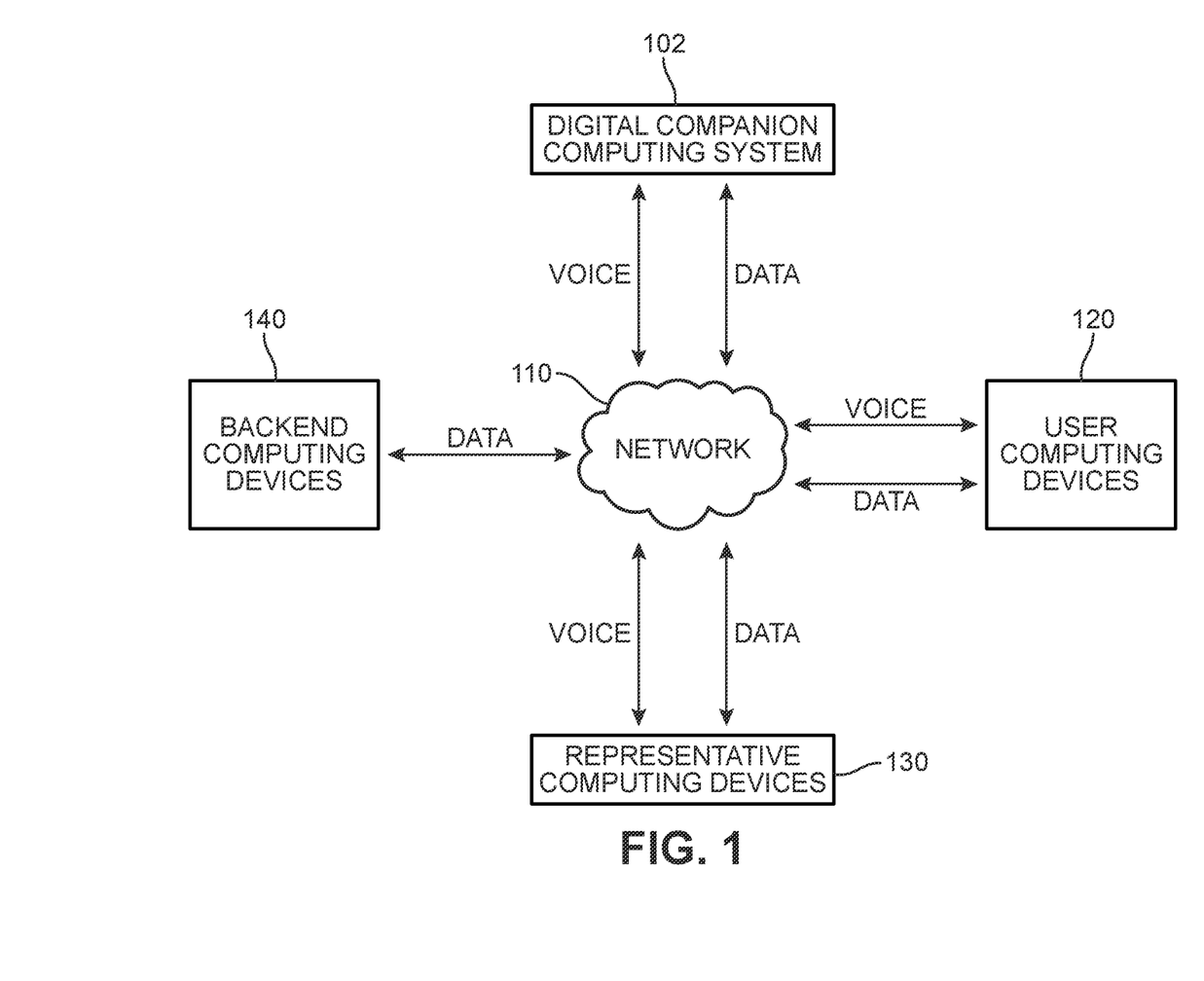
FIG. 1 is a schematic view of a system for task assistance in a multi-channel domain, according to an embodiment.

FIG. 1 is a schematic view of a configuration of a digital companion and associated components the digital companion may interact with as part of a service platform. As seen in FIG. 1, a digital companion computing system 102, also referred to simply as digital companion 102, may interact with a variety of components and services across one or more networks 110. For example, digital companion 102 can interact with one or more user computing devices 120, with one or more representative computing devices 130, and with one or more backend computing systems 140.

Each computing system or computing device may be understood to include at least one processor, as well as one or more types of memory. Additionally, one or more computing systems or devices could communicate with one or more databases.

Figure 2:
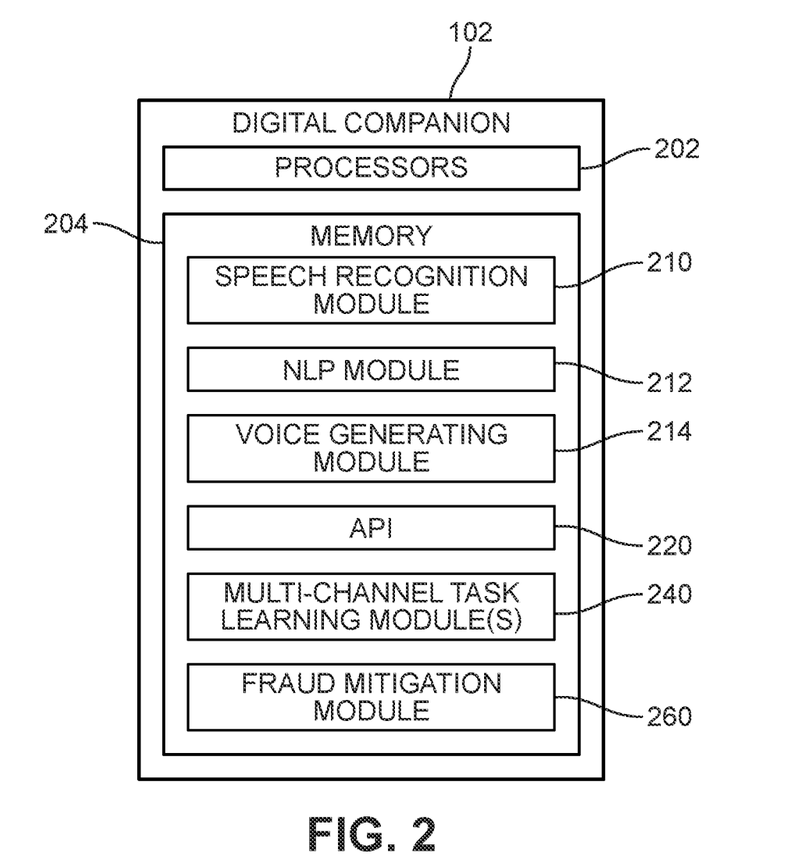
FIG. 2 is a schematic view of a digital companion, according to an embodiment.

As seen in FIG. 2, digital companion 102 can comprise a processor 202 and memory 204. Memory 204 may store instructions corresponding to various modules for performing multi-modal interactions. In one embodiment, digital companion 102 includes a speech recognition module 210, a natural language processing (NLP) module 212, and a voice generating module 214 for purposes of converting audio speech to text, extracting meaning from the converted text, and generating an audible response, respectively. Digital companion 102 also includes an application programming interface module (API) 220 that may be used to interface with one or more digital interfaces, such as websites, mobile web pages, native mobile applications or any other digital channels. For example, API 200 may be used to connect with an existing web session and retrieve data about what a user (or representative) may be seeing on the screen, input fields, and other relevant information.

Digital companion 102 may be configured to query backend computing systems 140 over network 110. This may be done to retrieve answers to questions asked by the user, or to answer questions generated by the system itself in the process of assisting the user.

To facilitate assisting users with tasks, digital companion 102 may comprise one or more multi-channel task learning module(s) 240. These various modules 240 may be associated with performing tasks, and could comprise models that have been trained via machine learning, heuristic or rule-based models. Once trained, the task learning module(s) 240 could then be deployed and used to facilitate real task assistance. In some cases, learning may be ongoing, with deployed systems continuing to learn in real time.

As described in further detail below, some embodiments may leverage the multi-modal task learning of the system to facilitate fraud detection and mitigation. In some embodiments, therefore, multi-channel task learning modules 240 could comprise one or more fraud detection modules. A fraud detection module may incorporate knowledge graphs, graph neural networks, as well as other suitable modules or components described in further detail below.

Additionally, in some cases, digital companion 102 could include a fraud mitigation module 260. Fraud mitigation module 260 may comprise one or more systems configured to take fraud limiting (or mitigating) actions. These include, for example, sending fraud alerts to customers via text, managing transaction verification requirements, limiting transactions amounts, and denying all transactions at a common merchant.

Multi-modal functionality may be acquired by training task learning modules on single channel domains, as well as on multi-channel domains. In some cases, a digital companion may be trained on scenarios that include multi-channel interactions. That is, the training data may comprise both voice data (or text) and training information specific to one or more specific tasks that occur within another channel, such as a digital interface.

Figure 3:
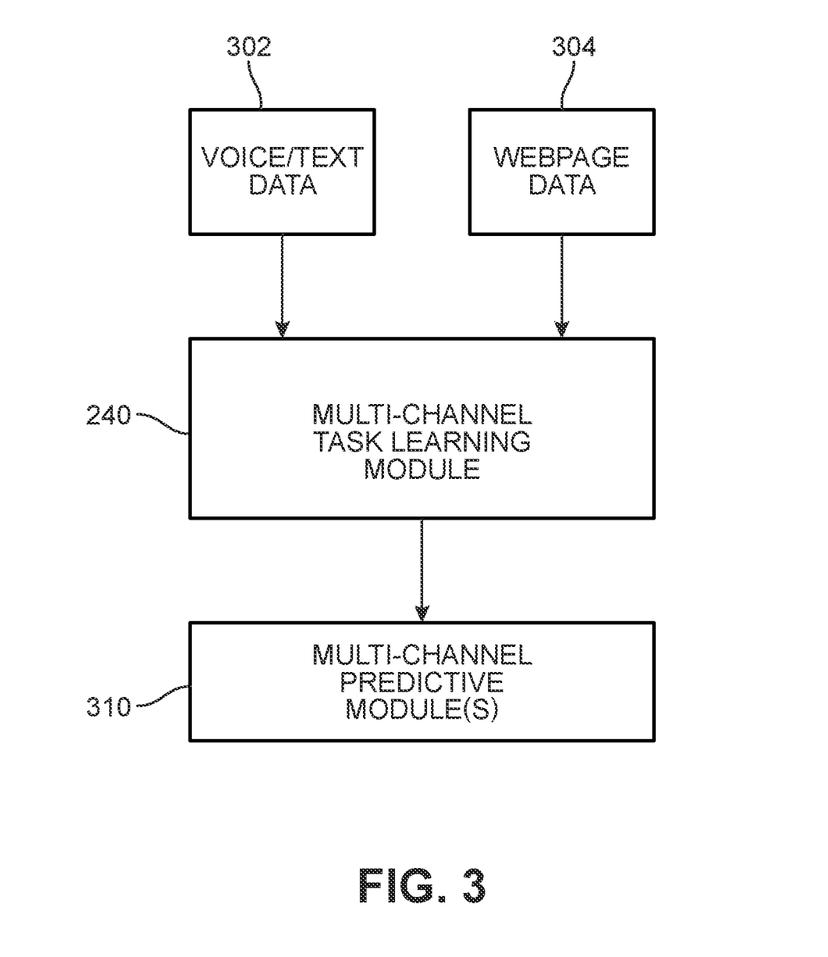
FIG. 3 is a schematic view of inputs and outputs to a multi-channel task learning module, according to an embodiment.

In the embodiment shown in FIG. 3, multichannel task learning module 240 may receive multi-channel inputs. These can include voice and/or text data 302, as well as webpage data 304. Voice and/or text data 302 may comprise any data related to conversations a user may have with an agent, either via voice or text-based chat. Webpage data 304 could include any information about a webpage, including form information, meta data, and any interactions that have performed by the user (or agent) on the webpage. In some cases, webpage data 304 could be provided as visual data that may be interpreted using machine learning or similar algorithms.

This training data could comprise data gathered over multiple channels as a representative helps guide the user in completing a task. The output of module 240 may be a multi-channel predictive model(s) 310 that can be used by the digital companion to help user's complete tasks. Specifically, the predictive model may take both speech/text and webpage data as inputs and provide predictive outputs that can be used by the digital companion to facilitate helping a user with a given task.

In operation, a digital companion could provide various kinds of assistance. In some cases, the digital companion could actively listen in on a call between a user and a representative, by leveraging its own natural language understanding. Then, when the user or representative invokes the digital companion, the digital companion could speak to one or both parties.

When a user has initiated a digital session, on a website, for example, the digital companion could be invoked from within the website. In some cases, for example, the digital companion could be invoked using a browser attachment that includes an "activation" button. To enhance user control, the system could be designed to ensure the digital companion can be separated from the digital session at any time by the user (and/or representative).

When engaged with a user's digital session, a digital companion could provide digital navigation and form filling on behalf of the user (or representative). Additionally, the behavior of the digital companion may be adaptive to the user's intent and skill.

Figure 4:
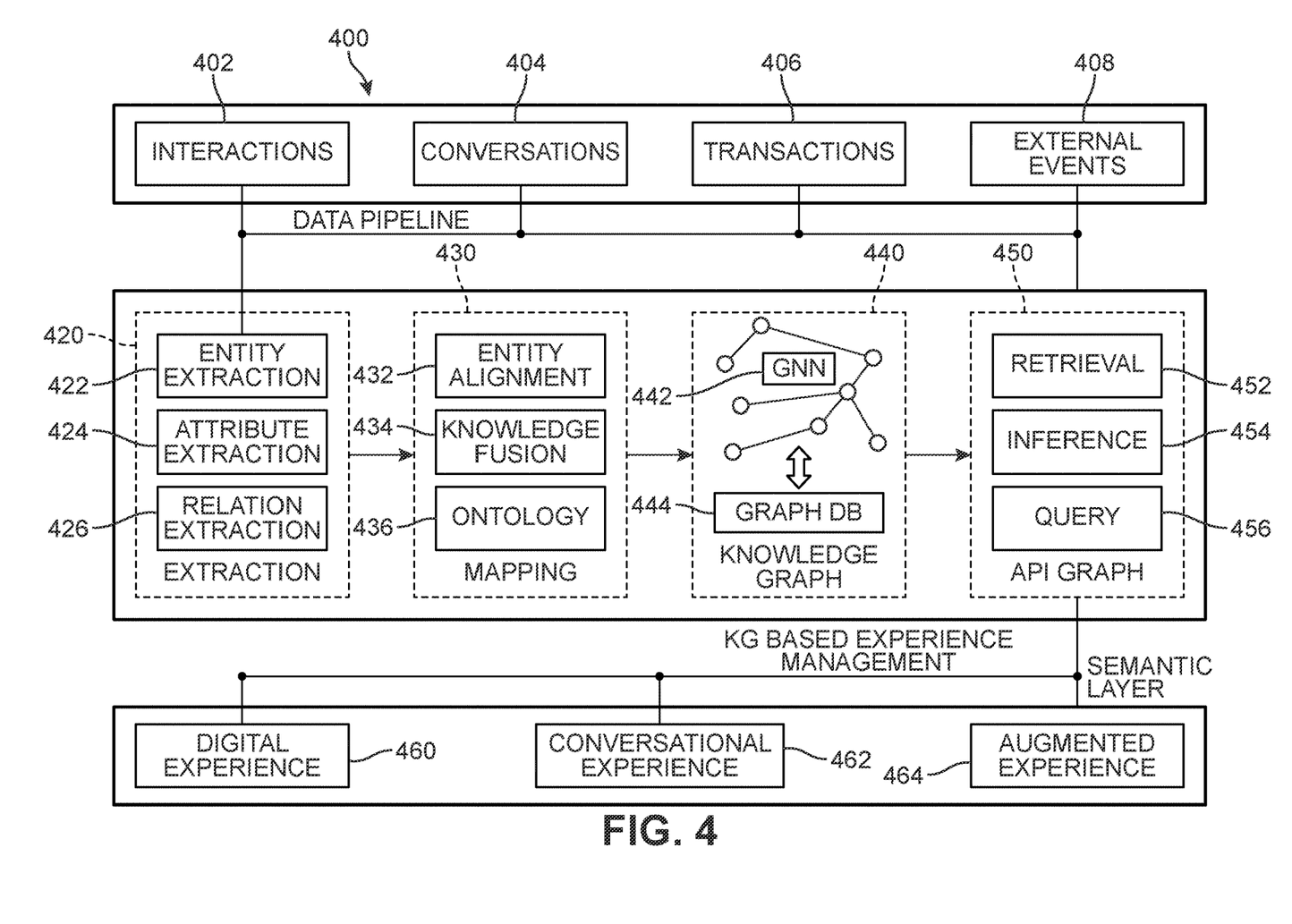
FIG. 4 is a schematic view of an architecture for a system that can take various kinds of inputs and dynamically manage a user's experiences, according to an embodiment.

FIG. 4 is a schematic view of a digital companion architecture 400 ("architecture 400"), according to an embodiment. As seen in FIG. 4, architecture 400 includes various sources of input. These may include, interactions 402, conversations 404, transactions 406, and external events 408. These include various modes or channels of communication between a digital companion and a customer, or other relevant party.

Data from multiple sources are collected within a data pipeline 410 and fed into an extraction module 420. Extraction module 420 may further include one or more sub-modules, such as entity extraction 422, attribute extraction 424, and relation abstraction 426.

Data processed by extraction module 420 and its various sub-modules, can be passed to a mapping module 430. Mapping module 430 may further include one or more sub-modules, such as entity alignment 432, knowledge fusion 434, and ontology 436.

The outputs of mapping module 430 are fed as inputs to a knowledge graph module 440. Knowledge graph module 440 may comprise a graph database 444. Knowledge graph module 440 may also comprise a graph neural network 442 that can be used to learn a suitable embedding of the graph data in graph database 444. Specifically, while the graph data may initially be represented within a high dimensional vector space, a graph neural network may help learn representations of the data in a more suitable embedding space, such as a (possibly continuous) low-dimensional vector space. Such low dimensional embeddings may allow a system to more readily detect relevant patterns that are obscured or simply undetectable when the data is represented within the higher dimensional vector space.

Outputs from knowledge graph module 440 may be passed to an application programming interface (API) graph module 450 ("API module 450"). API module 450 may further include several sub-modules, including retrieval module 452, inference module 454, and query module 456. In particular, once the graph data contained within knowledge graph module 440 has been transformed into a suitable embedding, the embedded representation of the data can be used to retrieve data, infer or predict new data, and/or query the knowledge graph for answers that can be found by looking at connections in the data. Of course it may be appreciated that the knowledge graph can be continually updated with new data, and that new, and possibly more suitable, embeddings can be learned as the knowledge grows or is otherwise modified.

Information from API graph module 450 can be made available for use in interfacing with customers or other users. In some embodiments, information available in API graph module 450 can be made available to a user's digital experience 460, a user's conversational experience 462, as well as a user's augmented experience 464.

Figure 5A:
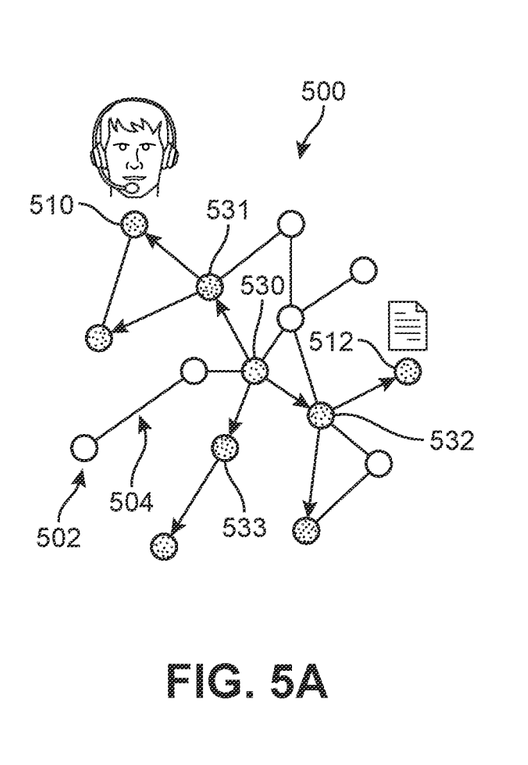
FIGS. 5A-C are schematic views of knowledge graphs, according to an embodiment.
Figure 5B:
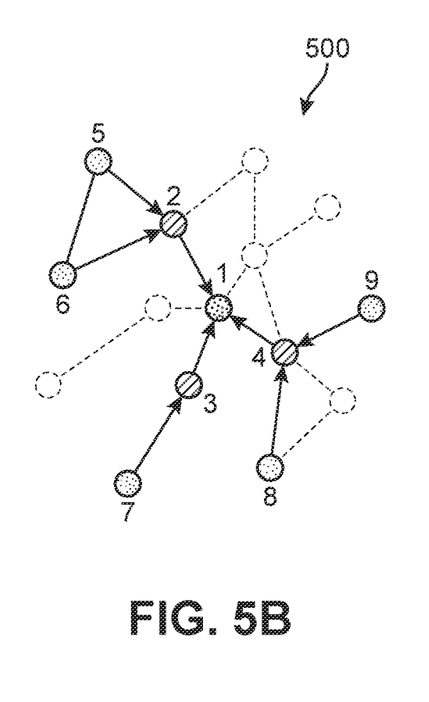
Figure 5C:
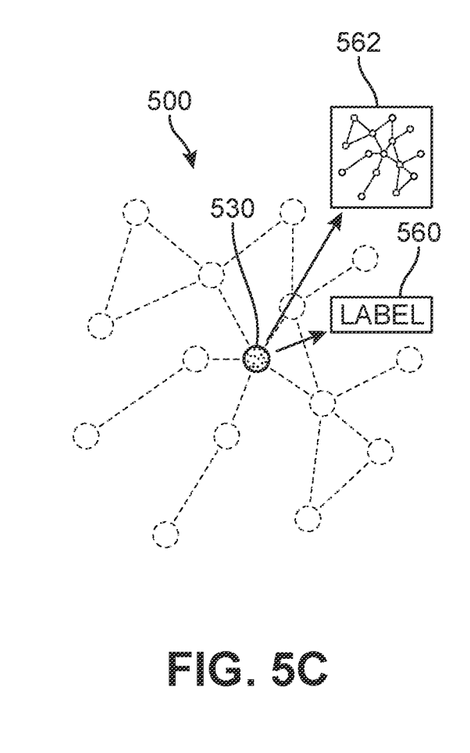

FIGS. 5A-C illustrated schematic views of a portion of a graph network 500 ("graph 500"), which is represented visually for reference. In this example, graph 500 includes multiple nodes 502 connected by edges 504. Each node may represent data corresponding to various events across different communication channels. As an example, a first node 510 comprises data corresponding to a transcript of a conversation between a customer and an agent of a call center. That is, first node 510 comprises data originating from a voice-based communications channel. As another example, a second node 512 comprises data corresponding to form data provided by a customer through a mobile application. That is, second node 512 comprises data originating from a mobile app-based communication channel.

It may be appreciated that data from different communication channels could have different structures. For example, a call center transcript may comprise lists of words. By contrast, form data received from a mobile app may be characterized by any combination of words and/or numbers that categorize the various possible inputs. Whereas the call center transcript comprises information from a conversation that is not necessarily constrained to a particular subject, the form data may comprise inputs whose values are constrained by the types of allowed inputs to the form and context about the form fields.

Because of the variety of data structures comprising graph 500, including data structures representing information from various different communication channels, the embodiments make use of knowledge graphs and associated graph neural networks to transform, organize, predict, and query data. As used herein, the term "graph neural network" refers to any neural network that uses graph structure to help in learning. In an exemplary configuration, nodes from graph 500 (which may comprise vectors of varying sizes) are mapped to an embedding space where latent features in the data (for example, hidden relationships) are more apparent.

Graph machine learning can make use of graphs of data to perform various tasks. Such tasks include, but are not limited to, node classification, link (or "edge") prediction, graph classification, and time series sequence prediction. These tasks can be achieved using one or more graph operations, which include, but are not limited to neighborhood searches, similarity, clustering, and transformation.

FIGS. 5A-C show a sequence for classifying the graph and/or predicting value(s) of a target node (node 530). Referring first to FIG. 5A, a sample neighborhood is selected for graph 500. This is a particular subset of the graph, where nodes are sufficiently close together according to a suitable metric. For example, a target node 530 has three adjacent nodes (node 531, node 532, and node 533). Each of these nodes has one or more adjacent nodes. In this example, the shaded nodes represent nodes that are sufficiently close together within the selected embedding space according to selected criteria, while the unshaded nodes represent nodes that may be related by other relationships that are not relevant within the selected embedding.

Once the sample neighborhood is selected, aggregate feature information from neighboring nodes are gathered (as in FIG. 5B) and used to predict a graph context (or class) label 562 and a label 560 for the target node 530. For reference, each node in the sample neighborhood in FIG. 5B is labeled with a number 1, 2, 3, 4, 5, 6, 7, 8, and 9.

Figure 6:
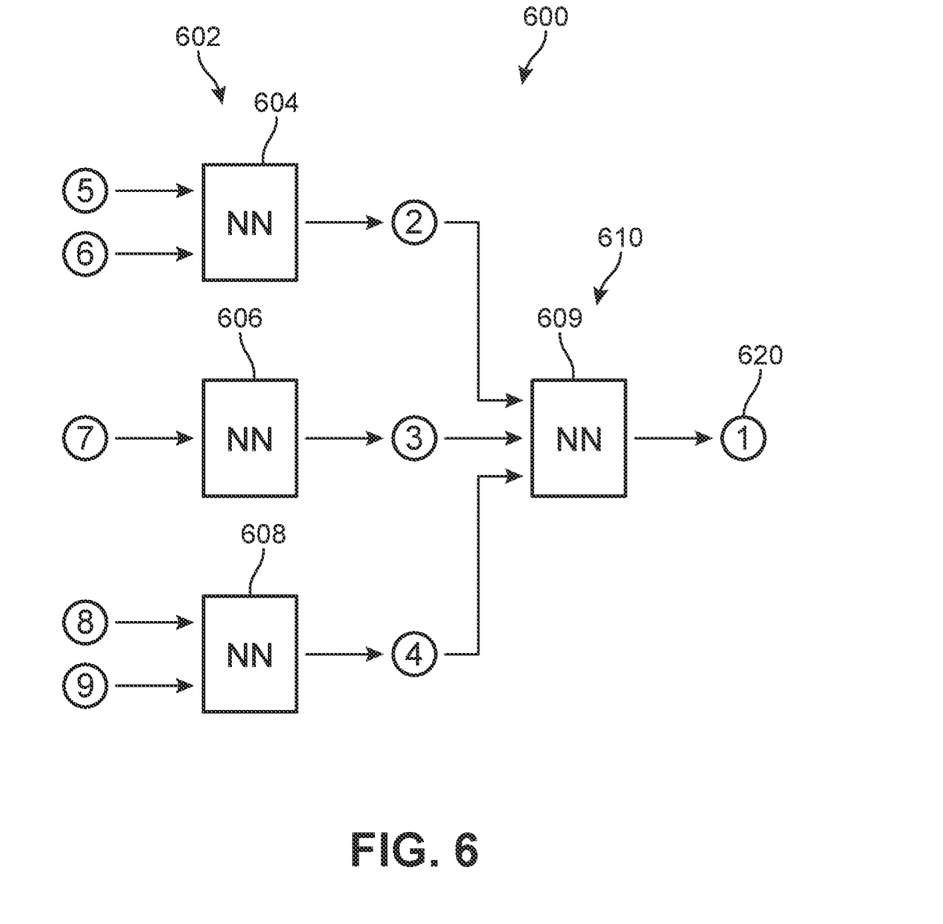
FIG. 6 is a schematic view of the use of a graph neural network for processing a graph of data, according to an embodiment.

FIG. 6 shows one exemplary method for assigning a label to a target node within a graph. Specifically, the architecture of FIG. 6 shows how data from each node is fed into a graph neural network 600 to predict a label for the target node (node "1") of FIG. 5B. Using the labeling of FIG. 5B, adjacent nodes are fed into multiple neural networks (network 604, network 606, and network 608) at a first layer 602. The outputs, which attempt to predict the values/labels at the nodes adjacent to the target node, are then fed into another neural network 609 at a second layer 610. For example, the values of node 5 and node 6 are fed as inputs into network 604 to predict the value of node 2. The final output 620 is a prediction for the value and/or label of the target node (that is, node "1").

The embodiments may include systems that facilitate fraud detection by analyzing data from different channels (for example, data from voice calls and data from online form submissions) using artificial intelligence and/or machine learning. Specifically, intelligent systems may comprise, in part, graph neural networks that can be leveraged to learn patterns in data acquired across different kind systems or channels. The graph neural networks can learn, and build models to predict, relationships across multi-channel data, from which the intelligent system can infer appropriate actions.

Disputed transactions may be an indicator of potential fraud. An example of a disputed transaction is a customer calling to dispute charges to their credit card for purchasing an item at a particular merchant. In particular, the customer may dispute that they ever purchased the item, suggesting that the transaction was made by another unauthorized party. In some embodiments, therefore, a knowledge graph-based learning module can be trained to identify patterns within transactions that are organized as nodes within a knowledge graph. Specifically, as new transactions are added to the knowledge graph in the form of new nodes of the graph, a graph neural network can be used to learn new representations of the data in which patterns of fraud may be more readily detected.

Figure 7:
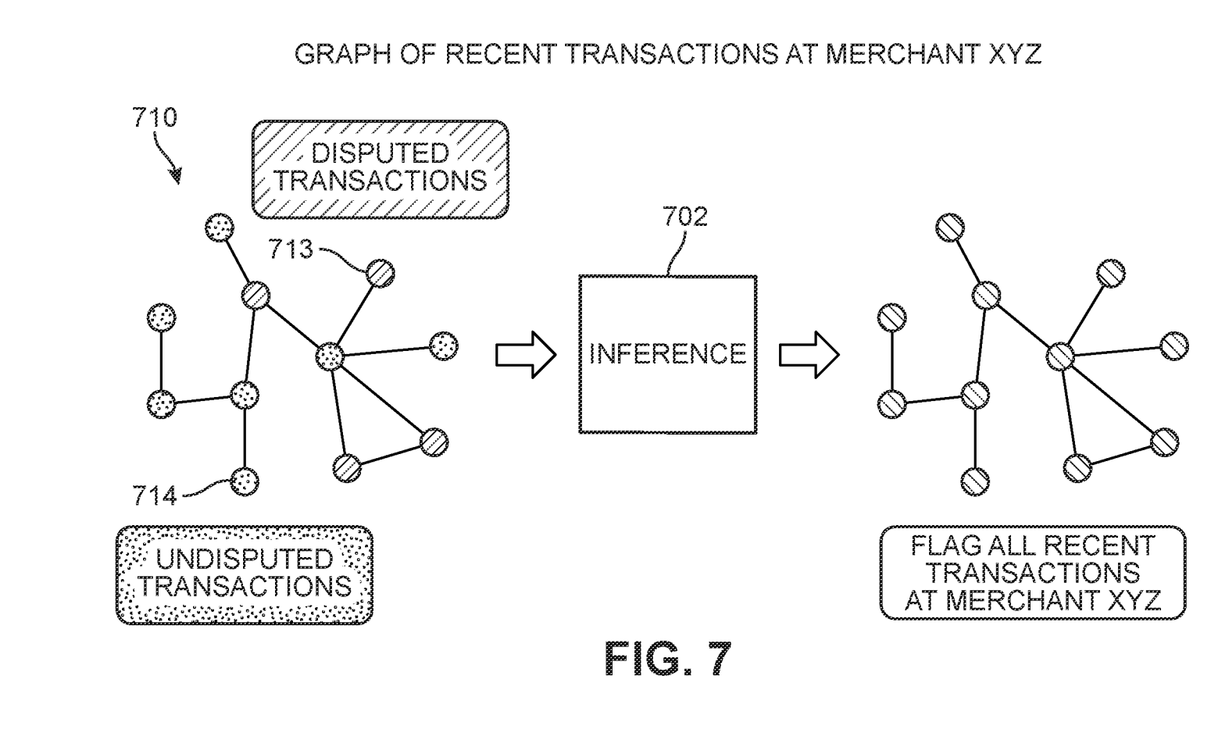
FIG. 7 is a schematic views in which a graph neural network is used to detect fraudulent patterns within a knowledge graph, according to an embodiment.

FIG. 7 is a schematic view of a portion of a knowledge graph 710 that includes nodes for various customer transactions (for example, debit card transactions). In this exemplary embodiment of a graph, if two nodes are linked together that indicates the corresponding transactions were made at the same merchant. Thus, the set of nodes in graph 710 all comprise transactions sharing a common merchant ("Merchant XYZ"). Moreover, each node is labeled as either a disputed transaction (for example, node 713) or as an undisputed transaction (for example, node 714).

Using inference (process 702), the system can automatically identify a pattern of potential fraud within knowledge graph 710. That is, the system automatically detects that there are a sufficient number (or density) of disputed transactions all sharing a common merchant. Based on this inference, the system decides to flag all recent transactions at Merchant XYZ, including the nodes currently labeled as undisputed, based on learned patterns.

It may be appreciated that in general, it may be extremely difficult to identify relevant patterns of fraud in data embedded in a high dimensional vector space. Therefore, the use of a knowledge graph and associated graph neural network for learning suitable embeddings of the data in low dimensional spaces is extremely useful in detecting patterns, such as transactions that are connected by a common merchant. Moreover, the embedding in which the data are connected by a common merchant is learned, and therefore does not require either manual analysis or brute force attempts to look at all possible connections between the data to find relevant patterns. Moreover, because the process of embedding the graph data into a lower dimensional space is iterative and uses information from previous embeddings, the system can gradually learn the best data representations for identifying clear patterns of possible fraud.

Figure 8:
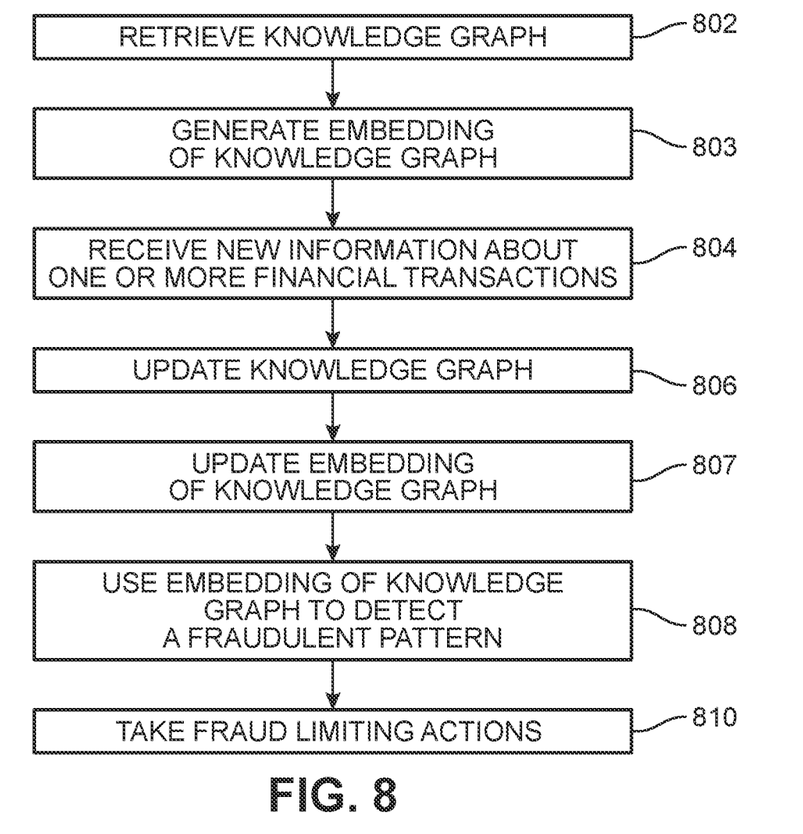
FIG. 8 is a schematic view of a method of detecting fraudulent patterns and taking fraud limiting actions, according to an embodiment.

FIG. 8 is a method for detecting a pattern of fraudulent transactions and taking fraud limiting actions in response, according to an embodiment. In some embodiments, one or more of the following steps can be completed by a system including a task learning module (such as multi-channel task learning module 240 of FIG. 3) and a fraud mitigation module (such as fraud mitigation module 260). In some cases, the system could be a digital companion (for example, digital companion 102 in FIG. 1), however in other cases, the system may be any other suitable system.

Starting in step 802, the system may retrieve a knowledge graph. The knowledge graph may comprise nodes connected to edges, where nodes correspond to information about a particular financial transaction and edges correspond to relationships between financial transactions. In step 803, the system may generate an embedding associated with the knowledge graph. In some cases, the embedding is generated using a graph neural network.

In step 804, the system may receive new information about one or more financial transactions. In some cases, this information could be received from an event-based streaming system, a financial transaction database, or any other suitable source. That is, as new transaction information is provided to a financial institution (such as a bank), this information can be passed to the system including the knowledge graph for storage and analysis.

Using the newly received financial transaction information, the system may update the retrieved knowledge graph in step 806. For example, the system could add a new node connected to one or more existing nodes. Alternatively, the system could update data associated with an existing node according to the recently received information.

After updating the knowledge graph, the embedding of the knowledge graph may also be updated in step 807, again, using the graph neural network. In some cases, the new embedding may be affected not only by the updated knowledge graph, but by the previous iteration of the knowledge graph embedding, so that a better representation can be learned over time.

In step 808, the system may detect or infer fraudulent patterns within the current embedding of the knowledge graph. In some cases, the fraudulent pattern may correspond to a particular subgraph of the knowledge graph that has a particular size, shape and/or network topology. In other cases, the fraudulent pattern may comprise another pattern in the embedding space which, unlike the discrete knowledge graph, could be a continuous low dimensional vector space. In one embodiment, the fraudulent pattern may be detecting a high count or density of a given node label (such as "disputed transactions") within a region of the embedded data.

In step 810, the system may take one or more fraud limiting actions in response to detecting the fraudulent pattern. Moreover, it may be appreciated that in embodiments where no fraudulent pattern has been detected, the system may not take any fraud limiting actions.

In some cases, this process may be repeated indefinitely, so that as the knowledge graph is being updated, the system is constantly reanalyzing the knowledge graph to look for patterns indicating possible fraudulent activity. In some cases, this continual updating and analysis may facilitate so-called "online learning" for the graph neural network, in which the network is trained using sequential data, rather than training the system with batches of data.

As discussed above, the type of fraud limiting action taken may depend on the severity of the fraud, and/or other specific characteristics of the fraud. In one example, a system could use the size of a fraudulent pattern as a parameter for determining an appropriate fraud limiting response. In one embodiment where the nodes correspond with financial transactions and are labeled as "disputed" or "undisputed", the system could consider the total number of disputed nodes as such a parameter. Alternatively, the system could use some other feature such as the graph shape and/or topology as a parameter.

Figure 9:
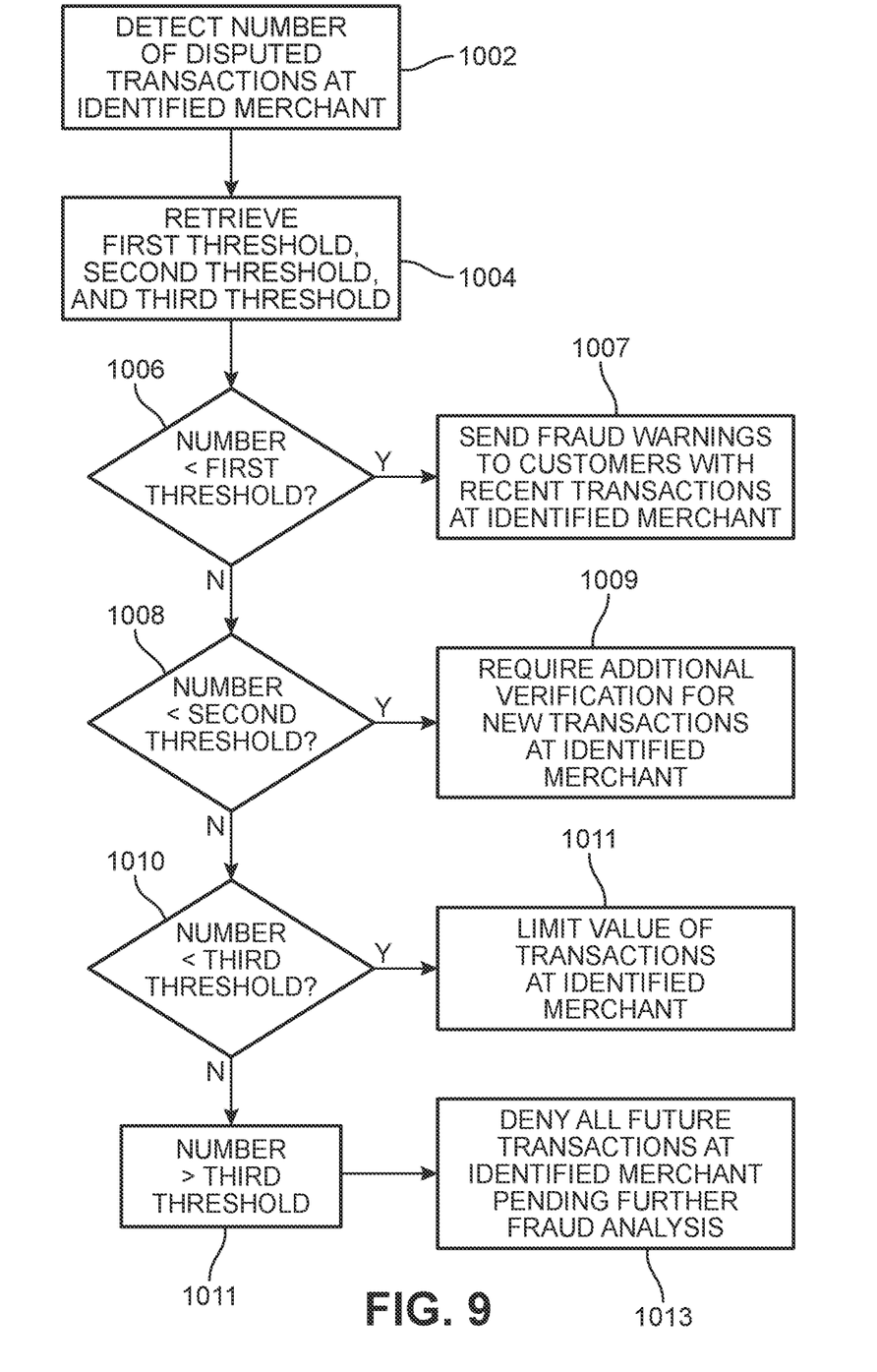
FIG. 9 is a schematic view of a method of taking different fraud limiting actions in response to the severity of fraud detected, according to an embodiment.

FIG. 9 is an exemplary method for taking different types of fraud limiting actions based on the number of disputed transactions within a graph of recent transactions, where the transactions have been identified as being related by a common merchant. After analyzing a knowledge graph and detecting a fraudulent pattern within the graph, the system may detect the number of disputed transactions at the identified merchant in step 1002. Next, the system can retrieve one or more thresholds. In this example, the system retrieves a first threshold, a second threshold, and a third threshold, in step 1004. The thresholds correspond to different numbers of disputed transactions in a detected fraudulent pattern, and thus define ranges of the parameter (number of disputed transactions in a local region of the graph) detected in step 1002, within which different fraud limiting actions may be taken.

In step 1006, the system determines if the number of disputed transactions is less than the first threshold. If so, the system moves to step 1007, where fraud warnings may be sent to customers with recent transactions at the identified merchant. For example, a bank may send SMS messages to its customers warning them about potential fraudulent activity at the merchant identified in a fraudulent pattern of disputed transactions. Customers may then decide to review recent transactions to determine if there was a fraudulent charge on their account at the identified merchant. If the number of disputed transactions is greater than the first threshold, the system proceeds to step 1008.

In step 1008, the system determines if the number of disputed transactions is less than the second threshold. If so, the system moves to step 1009, where the financial institution may require additional verification for transactions at the identified merchant. If the number of disputed transactions is greater than the second threshold, the system proceeds to step 1010.

In step 1010, the system determines if number of disputed transactions is less than the third threshold. If so, the system moves to step 1011, where the financial institution may limit the value of transactions made at the identified merchant. If the number of disputed transactions is greater than the third threshold, the system proceeds to step 1012.

In step 1012, the system determines that the number of disputed transactions is greater than (or equal to) the third threshold. In this case the system automatically proceeds to step 1013. At this point, the amount of fraudulent activity (or potentially fraudulent activity) is so great that the institution takes the action of denying all future transactions at the identified merchant pending further fraud analysis of all recent transactions at the identified merchant.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method of detecting and responding to fraudulent financial activity using a knowledge graph, comprising:
    retrieving the knowledge graph, wherein the knowledge graph includes a set of nodes corresponding to a plurality of financial transactions;
    the set of nodes in the knowledge graph having been generated from non-homogenous data corresponding to various events received from across a plurality of different communication channels;
    the plurality of communication channels including data originating from a voice-based communication channel related to one or more natural language conversations between a user and an agent of a call center in combination with one or more channels-selected from the group consisting of text data, webpage data, mobile application data, form data, interactions between the user and a webpage, interactions between an agent of the user and a webpage, and combinations thereof;
    generating an embedding of the knowledge graph within an embedding space;
    analyzing the embedding of the knowledge graph and detecting a fraudulent pattern within the embedding of the knowledge graph;
    wherein analyzing the embedding of the knowledge graph includes identifying a subset of nodes, out of the set of nodes in the knowledge graph, that are descriptive of transactions performed at a common merchant;
    wherein the step of identifying a subset of nodes that are descriptive of transaction performed at the common merchant is iterative and uses information from previous embeddings, as a result of the steps of retrieving the knowledge graph, generating an embedding of the knowledge graph, and analyzing the embedding of the knowledge graph being repeated using sequential data; and
    automatically taking a fraud limiting action in response to a dynamic system detecting efficiently the fraudulent pattern, the fraud limiting action including sending a message to a mobile computing device associated with the user;
    wherein the fraud limiting action further includes taking a first fraud limiting action when a number of disputed transactions at the common merchant is below a first threshold, taking a second fraud limiting action when the number of disputed transactions at the common merchant is greater than the first threshold and less than a second threshold, taking a third fraud limiting action when the number of disputed transactions at the common merchant is greater than the second threshold and less than a third threshold, and taking a fourth fraud limiting action when the number of disputed transactions at the common merchant is greater than the third threshold.

2. The method according to claim 1, wherein generating the embedding of the knowledge graph includes using a graph neural network.

3. The method according to claim 1, wherein the first fraud limiting action is sending the message to the mobile computing device associated with the user, the second fraud limiting action is requiring additional verification for transaction at the common merchant, the third fraud limiting action is limiting the value of transactions made at the common merchant, and the fourth fraud limitation action is denying all future transactions at the common merchant.

4. The method according to claim 3, wherein detecting the fraudulent pattern includes detecting a number of disputed transactions within the set of nodes.

5. The method according to claim 4, wherein automatically taking a fraud limiting action comprises identifying a customer for each transaction in the set of nodes and sending a fraud warning to each identified customer.

6. The method according to claim 1, wherein the method further includes receiving information about a new transaction and updating the knowledge graph to include the new transaction, and wherein the method further includes generating a new embedding of the updated knowledge graph.

7. A method of detecting and responding to fraudulent financial activity using a knowledge graph, comprising:
    retrieving the knowledge graph, wherein the knowledge graph includes a set of nodes corresponding to a plurality of financial transactions;
    the set of nodes in the knowledge graph having been generated from non-homogenous data corresponding to various events received from across a plurality of different communication channels;
    the plurality of communication channels including data originating from a voice-based communication channel related to one or more natural language conversations between a user and an agent of a call center in combination with one or more channels selected from the group consisting of text data, webpage data, mobile application data, form data, interactions between the user and a webpage, interactions between an agent of the user and a webpage, and combinations thereof;

generating an embedding of the knowledge graph in an embedding space;

analyzing the embedding of the knowledge graph and detecting a first fraudulent pattern within the embedding of the knowledge graph;

automatically taking a first fraud limiting action in response to a dynamic system detecting efficiently the fraudulent pattern, the first fraud limiting action including sending a message to a mobile computing device associated with the user;

analyzing the embedding of the knowledge graph and detecting a second fraudulent pattern within the embedding of the knowledge graph; and automatically taking a second fraud limiting action in response to detecting the second fraudulent pattern;

wherein analyzing the embedding of the knowledge graph includes identifying a subset of nodes, out of the set of nodes in the knowledge graph, that are descriptive of transactions performed at a common merchant;

wherein the step of identifying a subset of nodes that are descriptive of transaction performed at the common merchant is iterative and uses information from previous embeddings, as a result of the steps of retrieving the knowledge graph, generating an embedding of the knowledge graph, and analyzing the embedding of the knowledge graph being repeated using sequential data.

8. The method according to claim 7, wherein generating the embedding of the knowledge graph includes using a graph neural network.

9. The method according to claim 7, wherein either of the first fraud limiting action or the second fraud limitation action further includes taking a third fraud limiting action when a number of disputed transactions at the common merchant is below a first threshold, taking a fourth fraud limitation action when the number of disputed transactions at the common merchant is greater than the first threshold and less than a second threshold, taking a fifth fraud limitation action when the number of disputed transactions at the common merchant is greater than the second threshold and less than a third threshold, and taking a sixth fraud limiting action when the number of disputed transactions at the common merchant is greater than the third threshold.

10. The method according to claim 7, wherein detecting the first fraudulent pattern includes detecting a first number of disputed transactions within the set of nodes and wherein detecting the second fraudulent pattern includes detecting a second number of disputed transactions within the set of nodes, wherein the second number is greater than the first number.

11. The method according to claim 7, wherein one of the first fraud limiting action or the second fraud limiting action comprises sending fraud warnings to customers with recent transactions at the common merchant.

12. The method according to claim 7, wherein one of the first fraud limiting action or the second fraud limiting action comprises requiring additional verification for new transactions at the common merchant.

13. The method according to claim 7, wherein one of the first fraud limiting action or the second fraud limiting action comprises limiting a maximum value of a transactions at the common merchant.

14. The method according to claim 7, wherein one of the first fraud limiting action or the second fraud limiting action comprises denying all future transactions at the common merchant pending further fraud analysis.

15. A system for detecting and mitigating fraudulent financial transactions, comprising:
a device processor;
a non-transitory computer readable medium storing instructions that are executable by the device processor to:
retrieve a knowledge graph from a graph database, wherein the knowledge graph includes a set of nodes corresponding to a plurality of financial transactions;
the set of nodes in the knowledge graph having been generated from non-homogenous data corresponding to various events received from across a plurality of different communication channels;
the plurality of communication channels including data originating from a voice-based communication channel related to one or more natural language conversations between a user and an agent of a call center in combination with one or more channels-selected from the group consisting of text data, webpage data, mobile application data, form data, interactions between the user and a webpage, interactions between an agent of the user and a webpage, and combinations thereof;
generate an embedding of the knowledge graph in an embedding space;
analyze the embedding of the knowledge graph and detect a fraudulent pattern within the embedding of the knowledge graph;
wherein analyzing the embedding of the knowledge graph includes identifying a subset of nodes, out of the set of nodes in the knowledge graph, that are descriptive of transactions performed at a common merchant; and
automatically take a fraud limiting action in response to a dynamic system detecting efficiently the fraudulent pattern, wherein the fraud limiting action includes taking a first fraud limiting action when a number of disputed transactions at the common merchant is below a first threshold, taking a second fraud limitation action when the number of disputed transactions at the common merchant is greater than the first threshold and less than a second threshold, taking a third fraud limitation action when the number of disputed transactions at the common merchant is greater than the second threshold and less than a third threshold, and taking a fourth fraud limiting action when the number of disputed transactions at the common merchant is greater than the third threshold.

16. The system according to claim 15, wherein the instructions are further executable to generate the embedding of the knowledge graph using a graph neural network.

17. The system according to claim 15, wherein the first fraud limiting action is sending the message to the mobile computing device associated with the user, the second fraud limiting action is requiring additional verification for transaction at the common merchant, the third fraud limiting action is limiting the value of transactions made at the common merchant, and the fourth fraud limitation action is denying all future transactions at the common merchant.

18. The system according to claim 17, wherein the instructions are further executable to detect a number of disputed transactions within the set of nodes.

19. The system according to claim 18, wherein the instructions are further executable to identify a customer for each transaction in the set of nodes and send a fraud warning to each identified customer.

20. The system according to claim 15, wherein the instructions are further executable to receive information about a new transaction and update the knowledge graph to include the new transaction.

* * * * *